United States Patent
Rubio Hidalgo et al.

(10) Patent No.: US 10,739,616 B2
(45) Date of Patent: Aug. 11, 2020

(54) DETACHABLE SPECTACLE FRAME

(71) Applicant: AD EYEWEAR BCN, S.L., Barcelona (ES)

(72) Inventors: Aris Rubio Hidalgo, Barcelona (ES); David Soliva Rodríguez, Barcelona (ES)

(73) Assignee: AD EYEWEAR BCN, S.L., Barcelona (ES)

( * ) Notice: Subject to any disclaimer, the term of this patent is extended or adjusted under 35 U.S.C. 154(b) by 82 days.

(21) Appl. No.: 16/304,401

(22) PCT Filed: May 30, 2017

(86) PCT No.: PCT/ES2017/070368
§ 371 (c)(1),
(2) Date: Nov. 26, 2018

(87) PCT Pub. No.: WO2017/207847
PCT Pub. Date: Dec. 7, 2017

(65) Prior Publication Data
US 2019/0204618 A1    Jul. 4, 2019

(30) Foreign Application Priority Data
Jun. 1, 2016 (ES) ................ 201630712 U

(51) Int. Cl.
*G02C 5/22* (2006.01)
*G02C 5/14* (2006.01)
*G02C 1/08* (2006.01)

(52) U.S. Cl.
CPC ............ *G02C 5/146* (2013.01); *G02C 1/08* (2013.01); *G02C 5/2209* (2013.01);
(Continued)

(58) Field of Classification Search
CPC ........ G02C 5/146; G02C 5/22; G02C 5/2263; G02C 2200/22; G02C 5/2272; G02C 5/2281; G02C 5/229
(Continued)

(56) References Cited

U.S. PATENT DOCUMENTS

2015/0070648 A1* 3/2015 Chang ............... G02C 1/08
351/153

FOREIGN PATENT DOCUMENTS

CN   204964912 U   1/2016
DE   202011051142 U1   11/2011
(Continued)

OTHER PUBLICATIONS

International Search Report with English translation and Written Opinion dated Oct. 30, 2017 in corresponding International Application No. PCT/ES2017/070368; 15 pages.

*Primary Examiner* — Hung X Dang
(74) *Attorney, Agent, or Firm* — Maier & Maier, PLLC

(57) ABSTRACT

Detachable spectacle frame formed by a front, which in turn includes some rims, a bridge, some lugs and some nose pads; a pair of temples; in which each of the temples includes a hinge to engage the front, and a terminal end, where each of the rims and their corresponding temples has a defined slot. The removable frame being characterized in that each of the lugs further includes a laminar projection, finished by a hook; the hinge of each of the temples incorporates a recess and a kink and; further incorporates a fastening clip engaging the lug.

3 Claims, 4 Drawing Sheets

(52) U.S. Cl.
CPC ....... *G02C 5/2254* (2013.01); *G02C 2200/06* (2013.01); *G02C 2200/12* (2013.01)

(58) Field of Classification Search
USPC .......................................... 351/153; 16/228
See application file for complete search history.

(56) References Cited

FOREIGN PATENT DOCUMENTS

| | | | |
|---|---|---|---|
| EP | 2645153 | A2 | 10/2013 |
| WO | 2014/193202 | A1 | 12/2014 |

\* cited by examiner

DETACHABLE SPECTACLE FRAME

FIELD

The present invention falls within the technical field of the structures of non-optical spectacle pieces, and relates in particular to a spectacle detachable frame whose elements are linked together by press-fit removable mechanical means, without the intervention of welded joints or intermediate screws.

BACKGROUND

The spectacle frames are generally composed of a front frame or front, on which some lenses are arranged, and some rods or temples, intended to support the frame on the ears of a user.

Firstly, the front generally comprises some rims in which the lenses engage, for which some inner perimeter bezels, of geometry complementary to that of a bezel specific to the lens, are defined to ensure fastening between both elements and maintenance of the position. On the other hand, the front also includes a bridge for joining the rims together and some nose pads, intended to rest on the user's nose.

These frames are made of resistant and low elasticity materials, mainly hard plastic of acetate or metal type, or combinations of said materials, and are intended for permanent mounting of the lenses, it being necessary that any change of lens or of the frame elements is performed by a specialist, in order to avoid deterioration or breakage when disassembling the parts.

Thus, these types of rigid frames do not allow the user to proceed in a simple manner to their assembly and disassembly, and prevent the use of different frames with the same lenses; being therefore necessary that the user has a frame for each set of lenses, with the consequent expense increase.

On the other hand, the connection between the temples and the front is generally produced by a stud and an associated articulation. The articulation axis comprises in general a screw that links together the two parts of a hinge constituting the articulation.

The main issue of said screws is that they are easily loosened with use, being necessary to tighten them frequently to avoid an incorrect position of the spectacles and even the loss of the screw, with the consequent disassembly of the frame. This problem also arises when the temples are intended to be easily interchangeable by the user himself without the need to approach a specialist.

SUMMARY

The object of the invention consists of a detachable frame intended to house some lenses for forming spectacles, comprising the usual frame components which are linked together by attachment means than can be easily manipulated by the user himself, without the usual welded nor screwed joints having the drawbacks described above.

Accordingly, a protrusion or laminar projection is incorporated into the inner face of the front lugs, the end of which is finished with a hook-shaped protrusion. On the other hand, on the inner side of the terminal ends of the hinges of each of the temples, a protrusion with an angled geometry, referred to as kink, is defined to be engaged by pressure with the laminar projection of the front to create a hinged connection between the front and the temples and thus conform a spectacle, which allows the independent folding and unfolding of each one of the temples in relation to the front. In addition, the hinged connection thus described allows the automation in said folding movement of the temples on the front, since once a torsion point has been overpassed, it is not necessary to continue exerting a manual force on the temple to finish the folding thereof.

A clip-shaped platen secures and covers the joint between the front and the temples. Said clip is easily interchangeable and allows the insertion of decorative motifs on its external face, so the resulting frame is customizable.

In a preferred embodiment, all the elements of the frame are manufactured in the customary materials by precision die-cutting. The assembly thus described provides a practical and versatile solution for obtaining easily customizable spectacles, with joints between their elements that can be manipulated by the user himself without the need for additional tools, also avoiding the risks of loss of the attachment means described above that would render the frame useless and offering the possibility of obtaining multiple combinations between temples, fronts and clips to give rise to a completely customized spectacles according to the preferences of the user.

BRIEF DESCRIPTION OF THE DRAWINGS

In order to complement the description that is being made and in order to aid a better understanding of the characteristics of the invention, according to a preferred embodiment of practical implementation thereof, a set of drawings is attached as an integral part of said description, a set of drawings in which, with an illustrative and non-limiting character, the following has been represented.

DETAILED DESCRIPTION

A detailed explanation of a preferred embodiment of the object of the present invention is given below with the aid of the above-mentioned figures.

Figure 1:
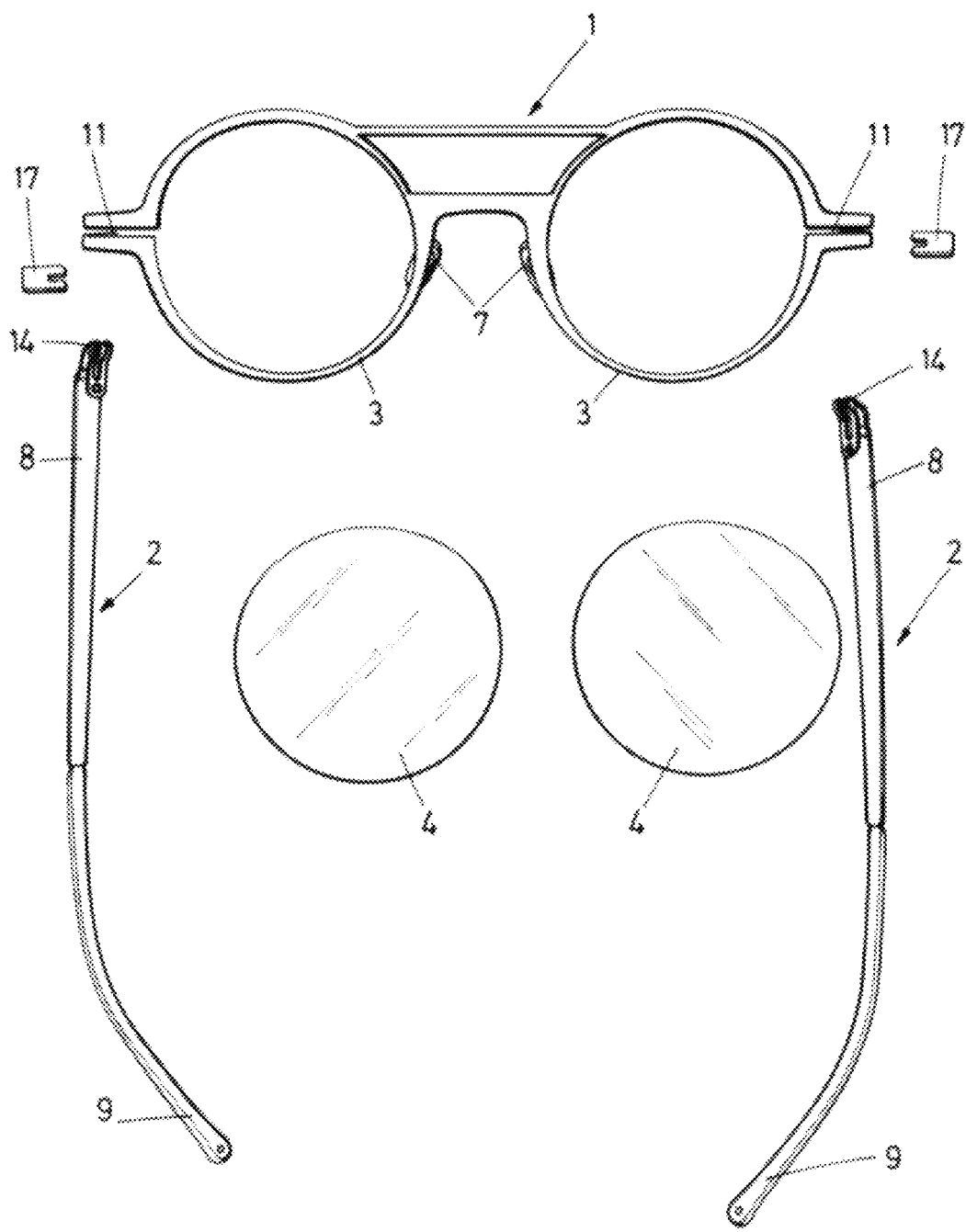
FIG. 1.—Shows a plan view of an exploded view of the detachable frame, including the lenses, in which its main constituent elements are appreciated.

The detachable spectacle frame described is formed by a front (1) and a pair of temples (2). The front (1) comprises in turn some rims (3) intended to receive some lenses (4), said rims (3) being connected to each other by a bridge (5), some lugs (6) defined on the rims (3) for attachment to the temples (2) and some nose pads (7) intended to rest on the nose of an individual, as shown in FIG. 1.

Each of the temples (2) in turn comprises a front end or hinge (8) intended for engaging the front (1), and a rear or terminal end (9), intended to rest on the individual's ear, with an essentially curved geometry to facilitate said support over the ear and provided with a plastic coating to avoid friction and discomfort. A lateral recess (10) is further defined on the external face of the hinge (8), intended to face the outside of the frame, as shown in FIG. 2.

On the other hand, each of the rims (3) and their corresponding lugs (6) has a defined dividing slot (11) to define an opening that allows the insertion of each of the lenses (4) in each of the rims (3) of the front (1), to form a spectacle.

Figure 2:
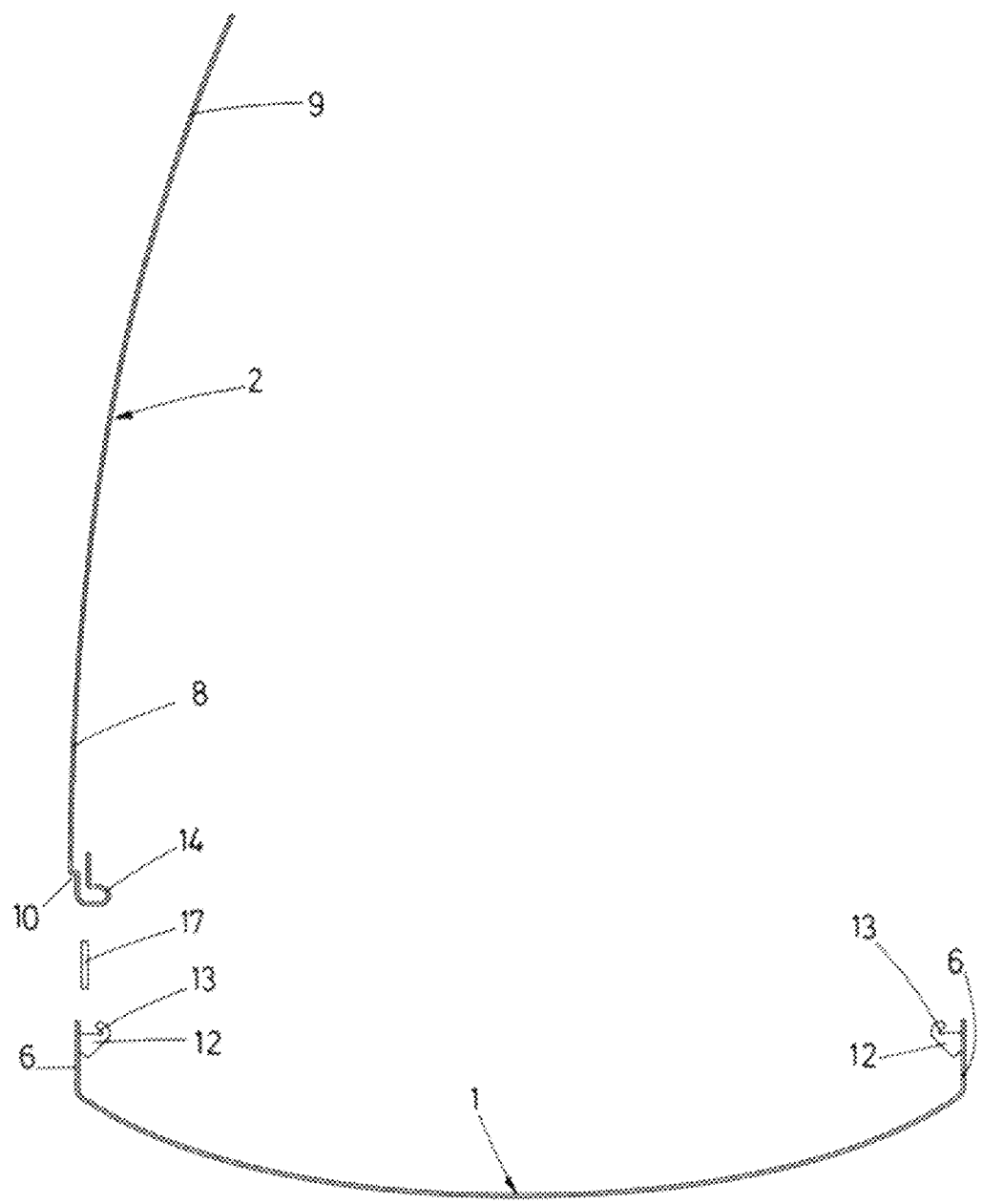
FIG. 2.—Shows a plan view of the front and the temples of the detachable frame.
Figure 3:
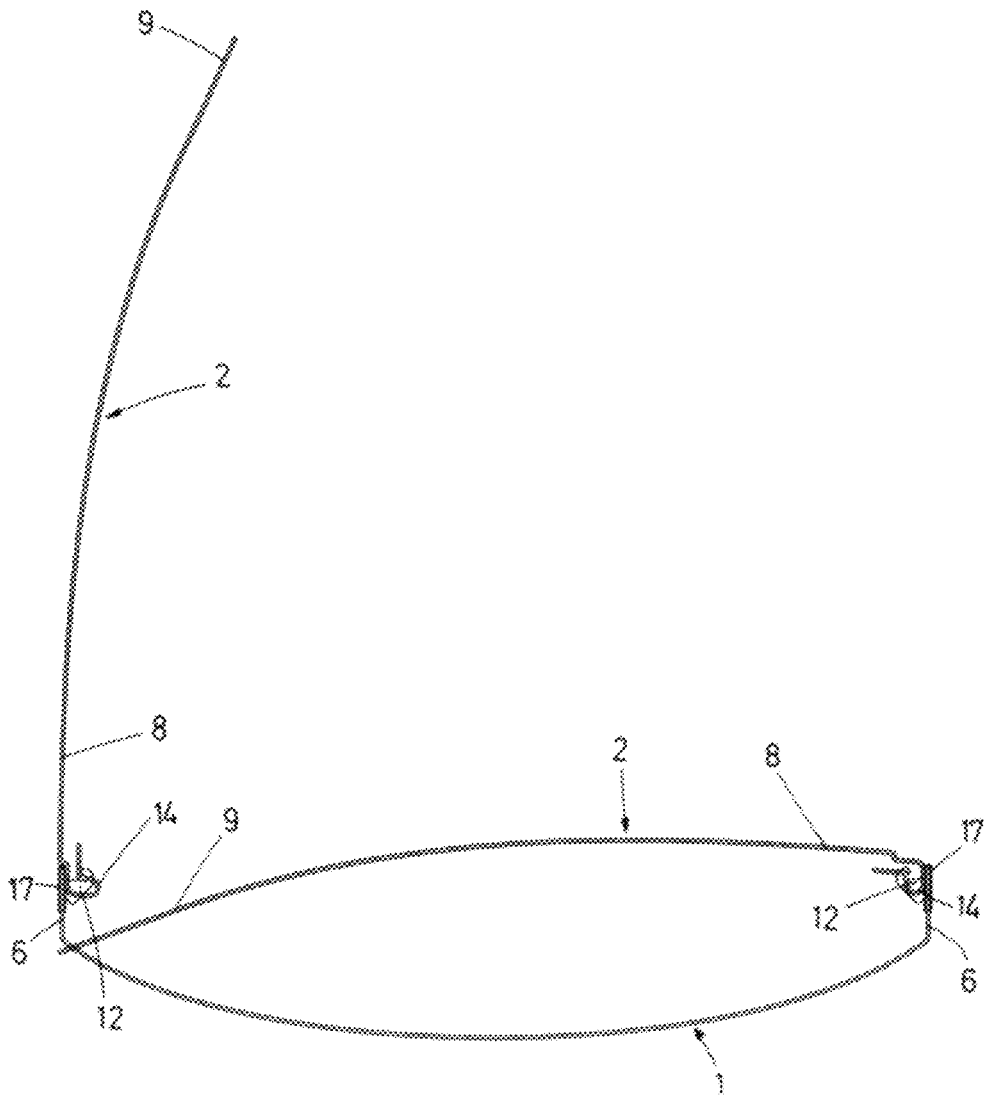
FIG. 3.—Shows a plan view of the detachable frame, with a folded temple and an unfolded temple.
Figure 4:
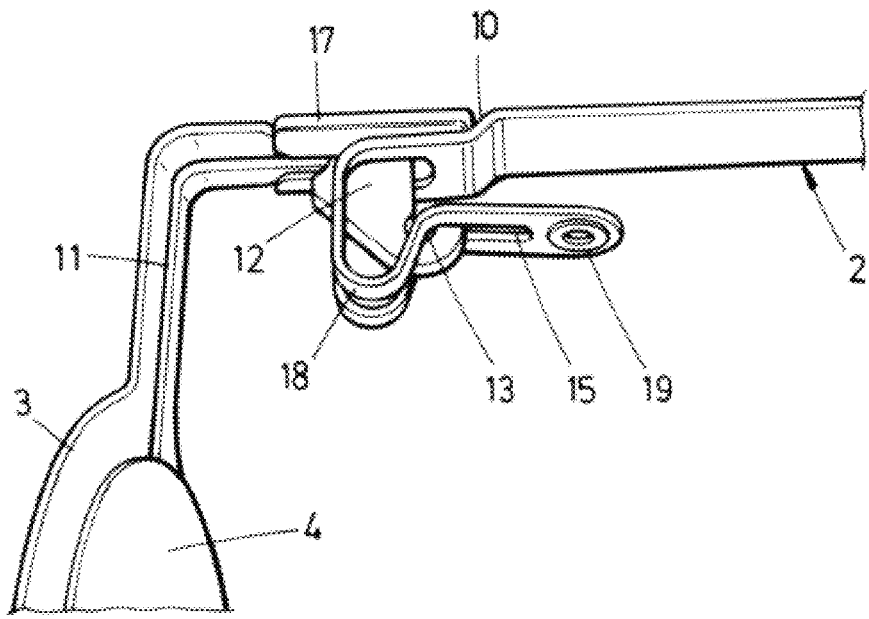
FIG. 4.—Shows a perspective view of a detail of the connection between the temple and the front from the interior of the frame.

On the inner face of each of the lugs (6) a protrusion or laminar projection (12) is defined, which extends inwardly, as shown in FIGS. 2 to 4, being finished by a hook (13).

On the other hand, from the inner face of the recess (10) defined in the hinge (8) of each of the temples (2) a kink (14) is projected towards the inside to be connected with the hook (13) of the front (1) to form the frame. The kink (14) has a defined central slot (15) within which intermediate protrusions (16) are defined. The kink (14) houses the laminar projection (12) once the engagement between each of the temples (2) and the front (1) has taken place, allowing rotation of the hinge (8) around the laminar projection (12) for opening and closing the temples (2) on the front (1), the hook (13) engaging the intermediate protrusions (16).

Figure 5:
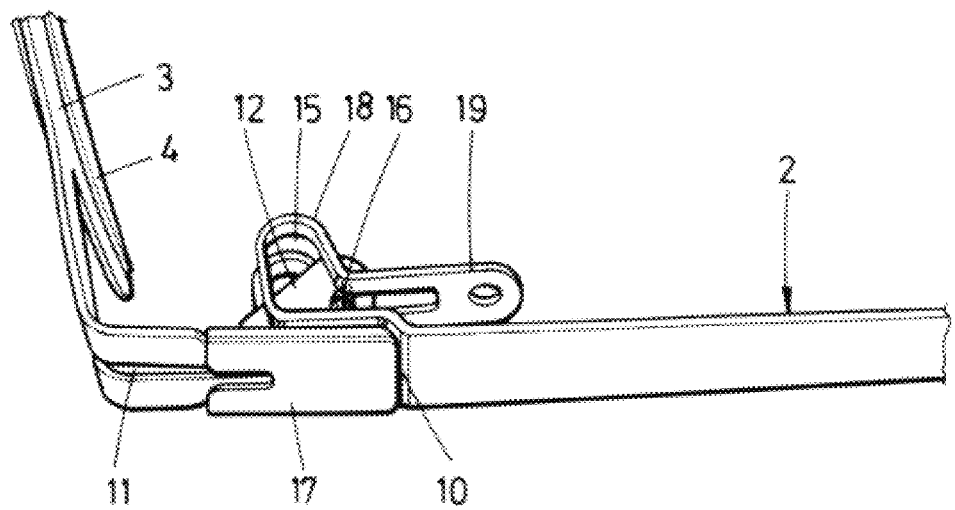
FIG. 5.—Shows a perspective view of a detail of the connection between the temple and the front seen from the exterior of the frame.

A substantially parallelepiped and planar geometry clip (17) with fixing and embellishment functions of the frame engages the lug (6) and is located on the recess (10) of the hinge (8), as shown in FIG. 5. Said clip (17) firstly has the function of securing the position of the dividing slot (11), thus avoiding the disengagement of the lenses (4) inserted into the rims (3). On the other hand, as seen in FIGS. 3 to 5, when covering the recess (10) of the hinge (8), the clip creates a continuous surface from the beginning of the (6) to the terminal end (9) of the temple (2). In addition, being easily interchangeable, allows changing the exterior appearance of the frame.

In the preferred embodiment described herein, the kink (14) comprises a first section (18) of essentially curved geometry, one end of which is projecting perpendicularly a second substantially straight section (19). The intermediate projections (16) in which the hook (13) engages are located in the section of the central slot (15) corresponding to the connection of the first section (18) with the second section (19) of the kink (14), as shown in FIG. 4.

The invention claimed is:
1. Detachable spectacle frame, comprising:
a front, which in turn comprises:
   a plurality of rims for housing some lenses;
   a bridge for joining the rims together;
   a plurality of lugs having a laminar projection extending towards the inside of the front and finished with a protruding hook; and
   a plurality of nose pads to rest over the nose of an individual; and
a pair of temples, wherein each one of the temples comprises:
   a hinge to engage the front, the hinge having a lateral recess defined at its end; and
   a terminal end to rest on the ear of the individual,
wherein each of the rims and their corresponding lugs has a defined slot, the detachable frame comprising:
   the hinge of each one of the temples which comprises
      an integrated kink projecting from the inner face of the recess towards the inside of the temple, provided with a central slot and having at least one intermediate protrusion defined inside said central slot to engage the hook of the laminar projection; and
      it further comprises a fastening clip that engages the lug to be allocated in the recess, which it covers superficially, to secure the position of the slot and mechanically interacts with the kink to facilitate automatic folding and unfolding of the temples on the front.

2. Detachable spectacle frame according to claim 1, wherein the kink comprises a first section of essentially curved geometry, one end of which is projecting perpendicularly a second substantially straight section.

3. Detachable spectacle frame according to claim 2, wherein the intermediate protrusions in which the hook engages are located in the section of the central slot corresponding to the connection of the first section with the second section of the kink.

* * * * *